US005493895A

United States Patent [19]
Cyr et al.

[11] Patent Number: 5,493,895
[45] Date of Patent: Feb. 27, 1996

[54] MODULAR PENETROMETER

[75] Inventors: Scott M. Cyr; Radford G. Ferre', both of Goleta, Calif.

[73] Assignee: Sonatech, Inc., Santa Barbara, Calif.

[21] Appl. No.: 293,988

[22] Filed: Aug. 17, 1994

[51] Int. Cl.$^6$ ...................................................... G01N 3/00
[52] U.S. Cl. ............................................. 73/12.13; 73/84
[58] Field of Search ......................... 73/84, 12.13, 12.11, 73/81

[56] References Cited

U.S. PATENT DOCUMENTS

| | | | |
|---|---|---|---|
| 4,007,633 | 2/1977 | Thompson | 73/84 |
| 4,065,746 | 12/1977 | Thompson | 340/55 |
| 4,186,373 | 1/1980 | Thompson | 367/131 |
| 4,492,111 | 6/1985 | Kirkland | 73/84 |
| 5,313,825 | 5/1994 | Webster et al. | 73/81 |
| 5,319,959 | 6/1994 | Cooper et al. | 73/84 |

OTHER PUBLICATIONS

Underwater Systems Design, *Developments in Cone Penetration Testing for Site Investigations*, by Dr. C. W. Swain, Fugro Limited, Feb./Mar. 1983.
Sonatech, Inc., Sounder, *Artic Tests Verify Performance of Penetrometer*, vol. 1, No. 1, Summer 1987.
Technical Report, R855, *Expendable Doppler Penetrometer: A Performance Evaluation*, by R. M. Beard, Jul. 1977.
Design News, *Seabed Penetrator Transmits Data by Wireless Signals*, Dec. 3, 1984.

*Sea Bed Surveys by Acoustic Penetrometer*, by Reginald J. Cyr.
Technical Report R905, *Expendable Doppler Penetrometer For Deep Ocean Sediment Strength Measurements*, by R. M. Beard, Mar. 1984.
Technical Report 242, *Interaction of Sound with the Ocean Bottom: A Three-Year Summary*, by H. E. Morris, E. L. Hamilton, H. P. Bucker, R. T. Bachman, Apr. 1978.

*Primary Examiner*—Richard Chilcot
*Assistant Examiner*—Jewel V. Artis
*Attorney, Agent, or Firm*—Nydegger & Associates

[57] ABSTRACT

A selectively configurable penetrometer device for impact testing the physical characteristics of the sea floor includes a hollow cylindrical housing which is formed with a recess. A hemispherical nose is engageable with one end of the housing and a removable fin assembly is selectively engageable with the opposite end of the housing. A transponder is engageable in a fluid tight seal with the end of the housing opposite the hemispherical nose to hold the electronic components in the recess of the housing. In the operation of the penetrometer, the transmitter emits a signal of precisely controlled constant frequency, and a remote receiver detects variations in signal receptions during impact of the penetrometer with the sea floor to determine the physical characteristics of the surface of the sea floor. The device can also include weighted spacers which can be selectively inserted into the device between the housing and the hemispherical nose. Additionally, the device can include an elongated coaxial probe of different lengths and diameters which extends from the hemispherical nose.

20 Claims, 1 Drawing Sheet

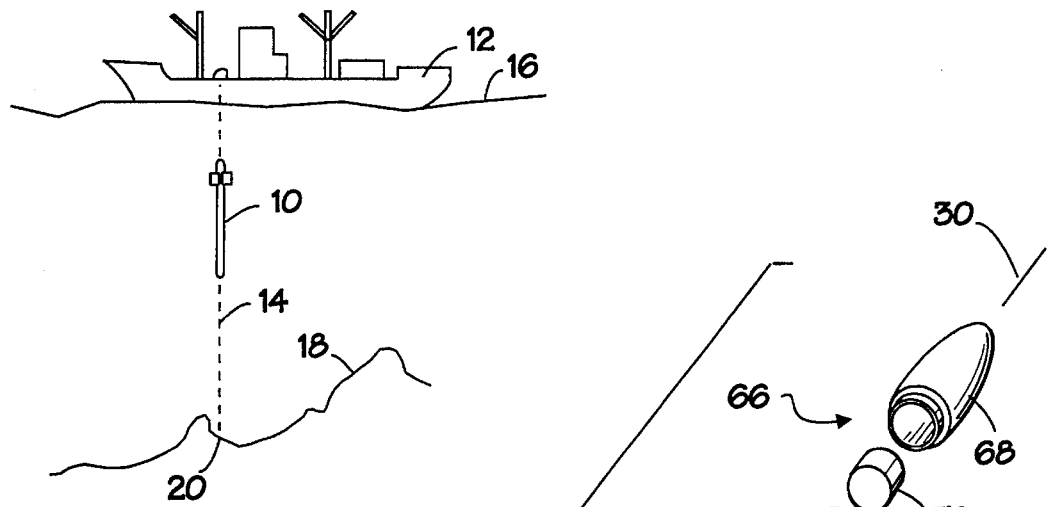
FIGURE 1.
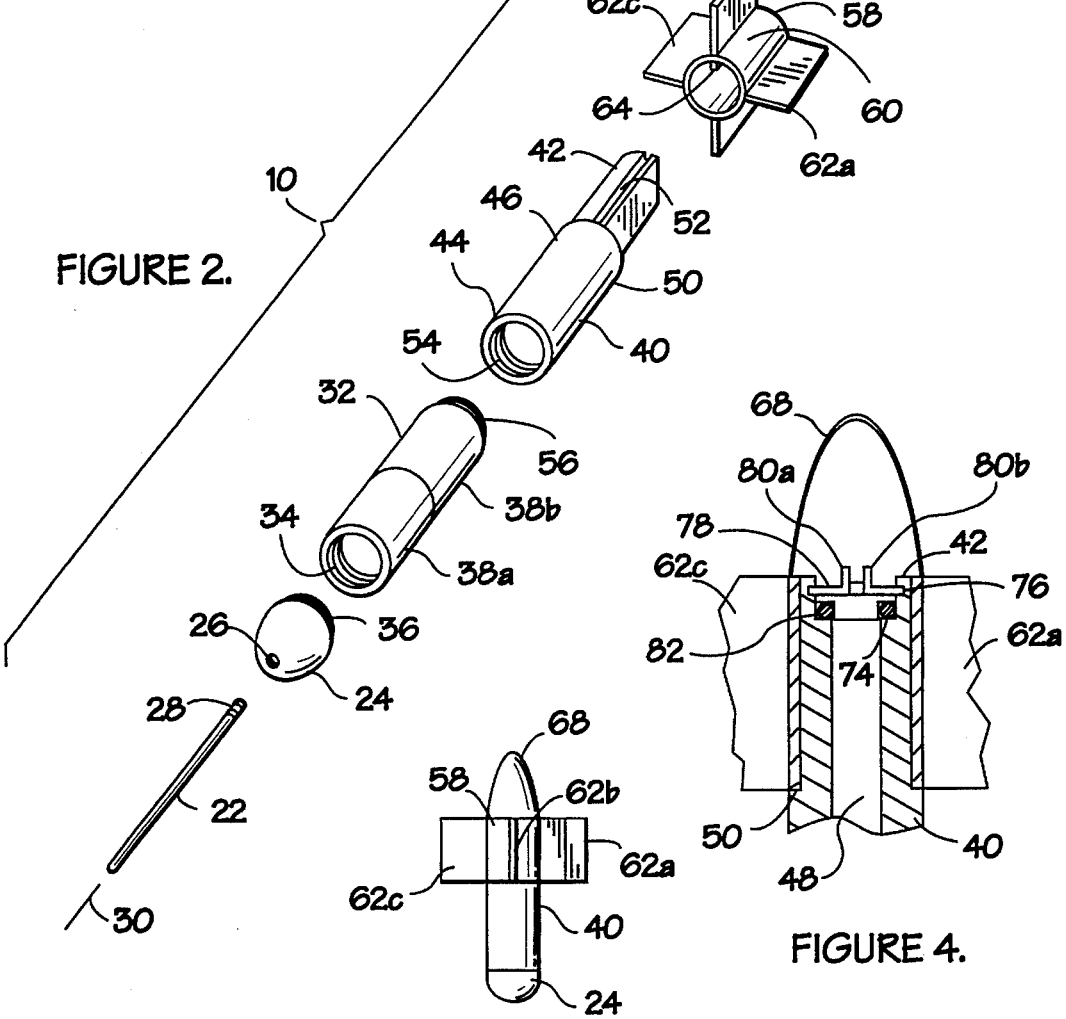

MODULAR PENETROMETER

FIELD OF THE INVENTION

The present invention pertains to testing devices which determine the physical characteristics and near surface conditions of ocean floor soil formations. More particularly, the present invention pertains to testing devices which emit a constant frequency acoustic signal and determine the physical characteristics of the sea floor by analyzing the doppler effect, i.e. frequency shift, which results during reception of the emitted signal as the device penatrates into the sea floor. The present invention is particularly, but not exclusively, useful as a modular penetrometer which can be easily reconfigured in length, weight and hydrodynamic characteristics depending on the depth and the particular conditions of the test site.

BACKGROUND OF THE INVENTION

Knowledge of the particular composition and structure of the sea floor in a particular area, or along particular paths on the sea floor, can be extremely valuable information. For instance, knowledge of the soil composition of the sea floor, to include the surface of the sea floor and the upper layer of the sea floor to a depth of approximately three or four feet, can be extremely helpful in selecting sites for underwater structures and determining workable routes for cable and pipe line locations.

One currently used method for testing the physical characteristics of the sea floor is accomplished by using an acoustic doppler penetrometer. A penetrometer is essentially a projectile-shaped body which carries an acoustic signal transmitter. In operation, a penetrometer is dropped into the water from a surface vessel or an aircraft, and allowed to attain its terminal velocity before impacting the sea floor. A remote receiver analyses the doppler effect on the acoustic signal which results as the penetrometer impacts and penetrates into the sea floor. Such a penetrometer is disclosed in U.S. Pat. No. 4,007,633 which issued to Thompson for an invention entitled "Method of Determining the Physical Characteristics of a Sea Floor."

As will be readily appreciated, the sea floor at different locations can have many different compositions, to include sand, clay and rock. Also, the sea floor will vary greatly in its depth from the surface of the sea. Depending on the depth of the sea floor at a particular location, and the particular composition of the sea floor at that location, different penetrometer configurations may be required to obtain the most reliable and accurate signals indicative of the sea floor characteristics at the location.

One variable in the construction of a penetrometer is its weight as this parameter effects hydrodynamic performances. Very heavy penetrometers may be necessary for test sites having particularly firm sea floor surface material. Heavier penetrometers, however, are not required for softer surface materials. Accordingly, not all penetrometers need to weigh the same. Further, different penetrometer configurations may require different configurations for fin assemblies to stabilize their descent toward the sea floor. Accordingly, not all penetrometers require the same hydrodynamic control surfaces. It also happens that for harder, firm, sea floor conditions, longer penetrometers having smaller impact surfaces may be desirable. Accordingly, not all penetrometers need to have the same shape and length.

The present invention recognizes that penetrometer configurations must necessarily vary in order to create the most efficient penetrometer profile and penetrometer structure for effective testing of the sea floor's physical characteristics. Further, the present invention recognizes that with the ability to selectively configure the most efficient penetrometer profile and penetrometer structure, while at sea over the test site, cost savings can be realized. Specifically, these cost savings can be realized through a significant reduction in the amount of different material components required.

In light of the above, it is an object of the present invention to provide a penetrometer which can effectively generate an acoustic signal that can be processed to provide data indicative of the sea floor at the point where the penetrometer impacts the sea floor. Another object of the present invention is to provide a penetrometer which can be selectively configured as to weight, profile, and hydrodynamic control surfaces, according to the anticipated condition of the sea floor at the test site. Yet another object of the present invention is to provide a penetrometer which will provide an effective fluid tight seal for the required electronic componentry. Still another object of the present invention is to provide a penetrometer which is simple to use, relatively easy to manufacture, and comparatively cost effective.

SUMMARY OF THE INVENTION

A modular penetrometer, according to the present invention, includes a hollow cylindrical housing which has an open end and a closed end A recessed compartment is thereby formed in the housing. A generally hemispherically shaped nose is selectively attachable to the closed end of the housing, and a fin assembly is selectively engageable with the housing at its open end. More specifically, the fin assembly has a tubular shaped body which slides over the outer surface of the housing and into contact with a circumferential abutment that is formed on the outer surface of the housing.

A transmitter assembly, and its associated electronic componentry, is engageable with the open end of the penetrometer housing to hold the electronic componentry of the penetrometer transmitter in the recessed compartment of the housing. With this engagement, a fluid tight seal is established between the transmitter assembly and the housing to protect the electronic componentry in the recessed compartment. Also, when the transmitter assembly is engaged with the housing, the transmitter assembly contacts the tubular body of the fin assembly and holds the fin assembly on the housing between the abutment on the outer surface of the housing and the transmitter assembly. As intended for the present invention, the transmitter assembly emits an acoustic signal having a precisely controlled constant frequency which is transmitted to a remote receiver for subsequent extraction of information.

An important aspect of the penetrometer of the present invention is the ability to configure the penetrometer according to the suspected characteristics of the sea floor test site. To do this, the structure of the penetrometer can be modified in several ways.

Additional weight can be added to the penetrometer to allow for greater penetration of the penetrometer into particularly firm sea floor material. This added weight comes from spacers which can be added between the housing and the hemispherical nose. The spacers are all identical to each other and are substantially solid cylindrical units which, preferably made of metal. Depending on the nature of the test site, any number of spacers can be added to form the body portion of the penetrometer. Of course, with the increased weight of added spacers, the length of the penetrometer will also increase.

Depending on the length and weight of the penetrometer, the hydrodynamic characteristics of the penetrometer will change. Consequently, the configuration of the fin assembly necessary to maintain the penetrometer on a substantially vertical path after its release into the water will also change. Accordingly, although the tubular body on all assemblies will remain the same for engagement with the housing, the fins on individual fin assemblies can vary to accommodate length and weight changes in the penetrometer.

Further modification of the penetrometer is possible with the addition of a probe on the hemispherical nose. Specifically, the probe is a cylinderical bar shaped member of selected length and diameter which is attached to the nose in coaxial alignment with the longitudinal axis of the penetrometer. With the addition of the probe, the penetrometer is able to penetrate deeper into harder or more compacted sea floor soils. For the present invention, different diameter and length probes are used depending on conditions.

In the operation of the penetrometer of the present invention, the penetrometer is configured with spacers, probe, and fin assembly as required for the particular sea floor test site. The transmitter is then activated via a sea water switch and the penetrometer is released into the water. As intended for the present invention, during its descent the penetrometer will accelerate and may attain its terminal velocity. Upon impact with the sea floor, however, the penetrometer will decelerate and come to rest. During descent of the penetrometer, a remote receiver continuously monitors the acoustic signal from the transmitter assembly in order to record the doppler effect during the impact event. Based on the signals received during the impact event, the physical characteristics of the sea floor are determined.

BRIEF DESCRIPTION OF THE DRAWINGS

The novel features of this invention, as well as the invention itself, both as to its structure and its operation will be best understood from the accompanying drawings, taken in conjunction with the accompanying description, in which similar reference characters refer to similar parts, and in which:

FIG. 1 is a generalized view (not to scale) of a penetrometer according to the present invention after the penetrometer has been released from a surface vessel;

FIG. 2 is an exploded perspective view of the penetrometer of the present invention;

FIG. 3 is a side elevational view of the penetrometer of the present invention; and FIG. 4 is a side elevational view of the penetrometer of the present invention as seen in FIG. 3 with portions cut away and portions shown in cross section for clarity.

DESCRIPTION OF THE PREFERRED EMBODIMENTS

Referring initially to FIG. 1, a penetrometer according to the present invention is shown and designated 10. As shown in FIG. 1, the penetrometer 10 has been released from a vessel 12 for travel along a substantially vertical path 14 from the surface 16 of the ocean to the sea floor 18. As intended for penetrometer 10 of the present invention, the penetrometer 10 will accelerate and may attain its terminal velocity before impacting the sea floor 18, and it will transmit an acoustic signal during impact with the sea floor 18 which can be used to ascertain characteristics of the sea floor 18 at the point of impact 20.

Referring now to FIG. 2, the various modular components of penetrometer 10 are shown. Beginning with the forward end of penetrometer 10, so named based on intended orientation during travel, the penetrometer 10 is shown to include a probe 22. The probe 22 is essentially a cylinderical metal bar having a selected length and diameter which is attachable to a substantially hemispherically shaped nose 24. For instance, probe 22 can have dimensions of 0.75 in.×24 in., 0.75 in.×48 in., 1.5 in.×24 in. etc. Specifically, the hemispherical shaped nose 24 is formed with a threaded receptacle 26 which is engageable with threads 28 of probe 22 to hold the probe 22 on nose 24. It is to be understood that other means, well known in the art, can be used to attach the probe 22 on nose 24. Importantly, however, when attached to the hemispherical nose 24, probe 22 should be substantially in coaxial alignment with the longitudinal axis 30 of the penetrometer 10.

A spacer 32 is shown which is selectively engageable with the hemispherical nose 24 by the interaction of respective threaded engagers 34 and 36. Preferably, because the primary purpose of the spacer 32 is to add weight to the penetrometer 10, the spacer 32 is a solid cylindrical structure which is made of a metal. Further, as shown in FIG. 2, the spacer may comprise a plurality of individual portions 38, of which the portions 38a and 38b are only representative. As shown, the portions 38a, 38b are not shown to scale. Depending on the number of portions 38 which are used to construct spacer 32, the spacer 32 may be quite long, and therefore quite heavy, as compared to the other components of the penetrometer 10.

A hollow cylindrical housing 40 is provided which generally defines the longitudinal axis 30 of penetrometer 10. For the present invention, the housing 40 has an open end 42 and a closed end 44 with an outer surface 46 therebetween. Thus, a recessed compartment 48 (best seen in FIG. 4) is formed in the housing 40 with access into the compartment 48 through the open end 42. A circumferential abutment 50 is formed on the outer surface 46 of housing 40, and a keyway 52 is provided on the outer surface 46 of housing 40 between abutment 50 and open end 42. A threaded engager 54 is provided at the closed end 44 of housing for selective engagement with either a threaded engager 56 on spacer 32 or threaded engager 36 of hemispherical nose 24.

It is to be noted that by alternately providing for engagement of housing 40 with either spacer 32 or hemispherical nose 24, the spacer 32 may be omitted from the construction of the penetrometer 10 (see FIG. 3). Further, spacer 32 may comprise only one portion 38, or it may comprise a plurality of portions 38. Thus, the length and weight of possible configurations for penetrometer 10 are many and varied.

As seen in FIG. 2, a fin assembly 58 is provided for penetrometer 10 of the present invention. This fin assembly 58 includes a tubular shaped body 60 on which a plurality of fins 62 are mounted. The fins 62a, 62b, and 62c are merely representative, and it will be appreciated by the skilled artisan that the fins 62 can be sized and configured as desired. The important consideration, of course, is that the fin assembly 58 be selected for its size and configuration depending upon the hydrodynamic stability required for penetrometer 10.

The body 60 of fin assembly 58 is also formed with a key 64 which is engageable with keyway 52 of housing 40. This cooperation of structure is intended to prevent rotation of fin assembly 58 relative to housing 40 when the two components are assembled. To accomplish this assembly, fin assembly 58 is dimensioned to slide over the open end 42 and outer surface 46 of housing 40 until the tubular body 60 of fin assembly 58 contacts abutment 50 on outer surface 46 of housing 40.

Also included in penetrometer 10 is a transmitter assembly 66 which includes a transmitter (not shown) that is held within a casing 68. Also, the transmitter assembly 66 has a circuit board 70 which contains the transmitter and control components, and a battery 72 which is electronically connected to the transmitter. For the present invention, it is intended that the circuit board 70 and battery 72 be held within the recessed compartment 48 of housing 40 under fluid tight conditions. This requires the transmitter assembly 66 be connectable to the open end 42 of housing 40 to establish a fluid tight seal therebetween. The structure used for the present invention to establish this fluid tight seal will be best appreciated by reference to FIG. 4.

In FIG. 4 it will be seen that an annular shoulder 74 is formed in the recessed compartment 48 of housing 40. Also, an annular slot 76 is formed in the recessed compartment 48 between the shoulder 74 and open end 42 of housing 40. FIG. 4 also shows that the casing 68 of transmitter assembly 66 includes an annular snap ring 78 with protruding prongs 80a and 80b which can be squeezed together to decrease the diameter of the snap ring 78. Also shown in FIG. 4 is an O-ring 82 which is positioned to rest on shoulder 74.

Upon engagement of transmitter assembly 66 with housing 40, the casing 68 is inserted into the recessed compartment 48 of housing 40 as shown. This insertion of casing 68 continues until snap ring 78 seats into the slot 76. At this point, casing 68 urges O-ring 82 against shoulder 74 to establish a fluid tight seal between the casing 66 and the housing 40 to protect the electronic components 70, 72 which are held with the recessed compartment 48. The transmitter assembly 66 can be removed from the housing 40, if desired, merely by squeezing the prongs 80a and 80b together. This action causes snap ring 78 to be freed from slot 76 to permit separation of the transmitter assembly 66 from housing 40.

While the particular modular penetrometer as herein shown and disclosed in detail is fully capable of obtaining the objects and providing the advantages herein before stated, it is to be understood that it is merely illustrative of the presently preferred embodiments of the invention and that no limitations are intended to the details of the construction or design herein shown other than as defined in the appended claims.

We claim:

1. A device for impact testing the surface of the earth which comprises:

a hollow cylindrical housing defining a longitudinal axis for said device, said housing having an outer surface and having an open first end and an enclosed second end to form a recessed compartment in said housing therebetween;

a fin assembly selectively engageable with said housing, said fin assembly having a plurality of fins aligned with said longitudinal axis during engagement of said fin assembly with said housing to direct said device along a vertical path;

a transmitter assembly for transmitting an acoustic signal of constant frequency, said transmitter assembly being attachable to said first end of said housing;

a spacer, said spacer having a selected weight to achieve desired penetration of the surface of the earth, said spacer comprises a plurality of portions, said spacer having a first end and a second end, said first end of said spacer being selectively attachable to said second end of said housing; and a nose selectively attachable to said second end of said spacer.

2. A device as recited in claim 1 further comprising a remote receiver for detecting variations in receptions of said signal to determine physical characteristics of the surface of the earth.

3. A device as recited in claim 1 wherein said spacer is a substantially solid cylinder made of a metal and said nose is substantially hemispherical.

4. A device as recited in claim 1 further comprising an elongated probe selectively attachable to said nose to extend therefrom in coaxial alignment with said device.

5. A device as recited in claim 1 wherein said housing has a circumferential abutment formed on said outer surface, and wherein said fin assembly includes a hollow tubular body, said hollow tubular body being slidingly engageable over said outer surface of said housing and into contact with said abutment to hold said fin assembly on said housing between said abutment and said transmitter assembly when said transmitter assembly is engaged with said housing.

6. A device as recited in claim 5 wherein said fin assembly is formed with a key and said housing is formed with a keyway for engaging with said key to prevent rotation of said fin assembly on said housing.

7. A device as recited in claim 1 further comprising:

an O-ring;

an annular shoulder formed on said housing in said recessed compartment near said first end of said housing for supporting said O-ring thereon;

an annular snap ring mounted on said transmitter assembly; and an annular slot formed on said housing in said recessed compartment between said shoulder and said first end of said housing for receiving said annular snap ring therein to hold said transmitter assembly on said housing and deform said O-ring on said shoulder against both said housing and said transmitter assembly to establish a fluid tight seal for said recessed compartment.

8. A device as recited in claim 1 wherein said transmitter assembly comprises:

a casing;

a transmitter mounted in said casing;

a circuit board electronically connected to said transmitter; and a battery electrically connected to said circuit board and said transmitter for activating said circuit board and said transmitter.

9. A system for determining the physical characteristics of the sea floor which comprises:

a transmitter assembly for transmitting an acoustic signal having a constant frequency;

a cylindrical housing having an outer surface and formed with a recessed compartment, said housing defining a longitudinal axis and being engageable with said transmitter assembly, and said housing having a circumferential abutment formed on said outer surface;

a nose engageable with said housing;

a fin assembly, said fin assembly having a hollow tubular body, said hollows tubular body being slidingly engageable over said outer surface of said housing and into contact with said abutment to hold said fin assembly on said housing between said abutment and said transmitter assembly when said transmitter assembly is engaged with said housing;

means selectively positionable between said housing and said nose, and respectively engageable therewith, for adding weight thereto;

means selectively engageable with said nose for extending penetration depth of said nose into said sea floor upon impact therewith; and remote means for receiving said acoustic signal from said transmitter assembly during descent of said transmitter assembly toward said sea floor and during impact of said transmitter assembly with said sea floor.

10. A system as recited in claim 9 wherein said means for adding weight is a spacer comprising a plurality of portions, each said portion having an end attachable to another said end of another said portion, and wherein said spacer is a substantially solid cylinder made of a metal.

11. A system as recited in claim 9 wherein said means for extending penetration depth is a probe extend from said nose in coaxial alignment with said housing.

12. A system as recited in claim 9, wherein said fin assembly is formed with a key and said housing is formed with a keyway for receiving said key therein to prevent rotation of said fin assembly on said housing.

13. A system as recited in claim 12 further comprising:
an O-ring;
an annular shoulder formed on said housing in said recessed compartment for supporting said O-ring thereon;
an annular snap ring mounted on said transmitter assembly; and
an annular slot formed on said housing in said recessed compartment for receiving said annular snap ring therein to hold said transmitter assembly on said housing and deform said O-ring on said shoulder against both said housing and said transmitter assembly to establish a fluid tight seal for said recessed compartment.

14. A method for configuring a penetrometer for impact testing the sea floor which comprises the steps of:
providing a cylindrical housing having a first end and a second end and defining a longitudinal axis, said housing having an outer surface with a circumferential abutment and a keyway formed thereon;
engaging a fin assembly with said housing, said fin assembly having a tubular body slidingly positionable over said first end of said housing and into contact with said abutment, said fin assembly having a key engagable with said keyway to prevent rotation of said fin assembly on said housing;
attaching a transmitter assembly to said first end of said housing to urge said fin assembly into contact with said abutment to hold said fin assembly on said housing; and
attaching a nose to said second end of said housing.

15. A method as recited in claim 14 further comprising the step of attachingly positioning a spacer between said housing and said nose to add weight to said penetrometer.

16. A method as recited in claim 14 further comprising the step of engaging an elongated probe to said nose to coaxially extend therefrom for extending penetration depth of said nose into said sea floor upon impact of said penetrometer therewith.

17. A device for impact testing the surface of the earth which comprises:
a hollow cylindrical housing defining a longitudinal axis for said device, said housing having an outer surface and having an open first end and an enclosed second end to form a recessed compartment in said housing therebetween;
a fin assembly selectively engageable with said housing, said fin assembly having a plurality of fins aligned with said longitudinal axis during engagement of said fin assembly with said housing to direct said device along a vertical path;
a transmitter assembly for transmitting an acoustic signal of constant frequency, said transmitter assembly being attachable to said first end of said housing;
a spacer, said spacer having a first end and a second end, said first end of said spacer being selectively attachable to said second end of said housing, and wherein said spacer comprises a plurality of portions, each said portion having an end attachable to another said end of another said portion; and
a nose selectively attachable to said second end of said spacer.

18. A device for impact testing the surface of the earth which comprises:
a hollow cylindrical housing defining a longitudinal axis for said device, said housing having an outer surface and having an open first end and an enclosed second end to form a recessed compartment in said housing therebetween;
a fin assembly selectively engageable with said housing, said fin assembly having a plurality of fins aligned with said longitudinal axis during engagement of said fin assembly with said housing to direct said device along a vertical path;
a transmitter assembly for transmitting an acoustic signal of constant frequency, said transmitter assembly being attachable to said first end of said housing; and
a nose selectively attachable to said second end of said housing;
wherein said housing has a circumferential abutment formed on said outer surface, and wherein said fin assembly includes a hollow tubular body, said hollow tubular body being slidingly engageable over said outer surface of said housing and into contact with said abutment to hold said fin assembly on said housing between said abutment and said transmitter assembly when said transmitter assembly is engaged with said housing.

19. A device as recited in claim 18 wherein said fin assembly is formed with a key and said housing is formed with a keyway for engaging with said key to prevent rotation of said fin assembly on said housing.

20. A device for impact testing the surface of the earth which comprises:
a hollow cylindrical housing defining a longitudinal axis for said device, said housing having an outer surface and having an open first end and an enclosed second end to form a recessed compartment in said housing therebetween;
a fin assembly selectively engageable with said housing, said fin assembly having a plurality of fins aligned with said longitudinal axis during engagement of said fin assembly with said housing to direct said device along a vertical path;

a transmitter assembly for transmitting an acoustic signal of constant frequency, said transmitter assembly being attachable to said first end of said housing;

a nose selectively attachable to said second end of said housing;

an O-ring;

an annular shoulder formed on said housing in said recessed compartment near said first end of said housing for supporting said O-ring thereon;

an annular snap ring mounted on said transmitter assembly; and an annular slot formed on said housing in said recessed compartment between said shoulder and said first end of said housing for receiving said annular snap ring therein to hold said transmitter assembly on said housing and deform said O-ring on said shoulder against both said housing and said transmitter assembly to establish a fluid tight seal for said recessed compartment.

\* \* \* \* \*